2,823,093

PROCESS OF PREVENTING DISCOLORATION OF NYLON TEXTILES WITH UREA, BIURET, DICYANDIAMIDE OR AMMONIUM CYANATE AND A CREASE PROOFING RESIN AND PRODUCTS PRODUCED THEREFROM

Fred Harold Steiger, Philadelphia, Pa., assignor to Rohm & Haas Company, Philadelphia, Pa., a corporation of Delaware No Drawing. Application January 21, 1955
Serial No. 483,437

15 Claims. (Cl. 8—115.6)

This invention relates to the treatment of nylon materials including polymers and shaped articles such as filaments, textile fabrics and the like formed therefrom for the purpose of reducing discoloration or yellowing caused by ageing at normal room temperature or by various treatments involving the application of heat to the nylon.

The term "nylon" is used in the specification and claims in its well-established meaning. It is a generic term for any long-chain synthetic polymeric amide which has recurring carbonamide groups as an integral part of the main polymer chain and which is capable of being formed into a filament in which the structural elements are oriented in the direction of its axis. The most common nylons are those obtained by condensation of diamines with dicarboxylic acids or by the auto-condensation of an amino-acid, such initial materials generally having at least six atoms in a chain. For example, the most common specific nylon resin is that obtained by the condensation of adipic acid with hexamethylenediamine.

It is known that nylon materials now in commercial use yellow on ageing and also as a result of operations involving heating such as during ironing and in the baking or curing of stiffening, antistatic, flameproofing, waterproofing, and other finishes applied to the nylon, especially to nylon fabrics, such as those comprising heat-convertible urea-formaldehyde condensates.

According to the present invention, it has been discovered that the discoloration or yellowing of nylon materials on ageing or as the result of heating operations can be greatly reduced or eliminated by treating the nylon material with a discoloration-inhibiting compound of the group consisting of urea, biuret, dicyandiamide, and ammonium cyanate, and subsequently heating the treated nylon material at a temperature of at least 240° F. After so treating the nylon materials, they may be subjected to various heat treatments such as ironing, embossing, and laundering operations without exhibiting excessive discoloration or yellowing as would be caused when such operations are applied to nylon materials which have not been treated with the inhibiting compounds of the present invention. Nylon textile materials treated in accordance with the present invention may also be provided with heat-convertible resinous finishes adapted to stiffen, creaseproof or crush-proof such textile materials without encountering the yellowing or discoloration that normally occurs when nylon textile materials without the application of inhibiting compounds of the present invention are provided with such resin-forming condensates and subjected to a baking step. For example, the heat-convertible resin-forming condensation products may be any of those of the aminoplast type such as the methylol ureas, the alkylated methylol ureas obtained by the reaction of urea with formaldehyde and a lower alcohol of one to four carbon atoms, such as methanol, corresponding methylol thioureas and alkylated methylol thioureas and corresponding methylol triazines or alkylated methylol triazines of which melamine is a representative specific member. The general procedure for producing the heat-convertible aminoplast that may be applied for stiffening the nylon textile fabric may be illustrated by the following description for producing an alkylated methylol urea.

Thus, the alkylated methylol urea may be obtained by reacting a mixture of urea with formaldehyde and the particular alcohol in aqueous medium, or it may be produced by first reacting urea with formaldehyde in aqueous medium and then reacting the resulting hydrophilic condensate with a particular alcohol. In either case, the proportions between the various reactants preferably fall in definite limits. The molar ratio between the formaldehyde and urea should be at least 2:1 in moles and is preferably between 2:1 and 3:1. Higher proportions of formaldehyde may be present but are unnecessary and generally undesirable. The molar ratio of the alcohol to the urea should be between 2.5:1 and 4:1. A greater amount of alcohol may be present but is unnecessary. Conventional conditions of reaction for producing these alkylated methylol ureas may be employed. For example, the reaction between urea and formaldehyde may be effected at temperatures of 30° to 80° C. for periods of time from fifteen minutes to three quarters of an hour at a pH of 8 to 10. The reaction with the alcohol may then follow after adjusting the pH to within the range of 3 to 4.5 at temperatures of 60° to 90° C. for a time of fifteen minutes to one hour. The resulting condensate is a low molecular weight water-soluble alkylated polymethylol urea of about 75% to 90% concentration in an aqueous alcohol solution.

The application of such aminoplast stiffening agents and the curing thereof on the nylon textile material is accompanied normally by a distinct yellowing of the textile material even when the heat-convertible condensate is of the type containing urea. Surprisingly, preliminary treatment of the nylon textile material with urea before application of the urea-formaldehyde condensate serves to inhibit the discoloration normally obtained in the application of such stiffening finishes to the textile fabric without decreasing the stiffening effect of the aminoplast finish. It has been found that the introduction of free urea in the aminoplast composition tends to decrease the yellowing produced but also substantially reduces the stiffening effect obtainable. It has also been found that the pre-treatment with discoloration inhibitors of the present invention produces no noticeable reduction in strength of the nylon materials.

In carrying out the invention, the nylon polymer is treated with the urea or other inhibiting compound of the group mentioned above in any suitable manner. Formed or shaped articles of the nylon material may be dipped into an aqueous solution of the urea or the like inhibitor or such an aqueous solution may be applied by spraying, brushing, transfer rolls partially immersed in such an aqueous solution, by a textile pad or the like. If the nylon polymer has not yet been converted to a formed or shaped article, the urea may be introduced into a melt of the nylon. When applied by aqueous solutions, the concentration of the inhibitor therein may be in the range of 5% to 50% by weight or more up to the limit of solubility. The solution at the time of application may be at room temperature or even up to the boil, but is preferably not actively boiling to provide more uniform impregnation. After application, excess may be removed from the nylon articles by shaking or vibrating, wiping, squeegeeing or squeezing, depending on the character of the article or articles. Thereafter the treated articles may be dried either at normal ambient air temperatures or at elevated temperatures either with heated air or by the application of radiant heat, such as by infrared lamps and so on. Thereafter the treated nylon material is baked or cured at a temperature of 240° F. to 450° F. for a time which is dependent on the temperature and is generally inversely proportional to the temperature; for example, at 240° to 250° F. reaction may be effected in two to four hours whereas at 300° to 320° F. two to ten minutes would suffice and at about 450° F. about two to fifteen seconds may be used.

It is believed that the inhibitor reacts with terminal amine groups in the nylon materials during the baking or curing operation just mentioned. However, it is not intended to be limited to any particular theory of operation.

After drying the inhibitor-treated nylon fabric, there is generally 5% to 15% of the inhibitor deposited on the fabric based on the weight of the fabric. However, it is not essential that all of this inhibitor be reacted with the nylon and, in fact, rinsing of the treated fabric with water after the baking operation may be effected for the purpose of removing any unreacted inhibitor. Generally, reaction of as little as 1% of the inhibitor based on the weight of the fabric serves to impart a marked improvement in the resistance to discoloration of the treated nylon on subsequent heating, but for most purposes it is preferred that 2% to 5% by weight or more of the inhibitor be reacted with the nylon.

The treatment with the inhibitor of the invention may be applied to unshaped nylon material or it may be applied to shaped or formed articles of all types, such as fibers, filaments, yarns, cords, textile fabrics woven, knitted or otherwise formed from fibers, filaments or yarns of the nylon material, or it may be applied to films, pellicles, sheets or more massive formed bodies of the nylon.

The application of the discoloration inhibitors also modifies the dyeing properties of the nylon. This property may be used to advantage when it is desired to reduce the intensity of dyeing with acid dyes. For example, when cross-dyeing effects are desired on wool-nylon blends, the nylon fibers, filaments, or yarns may be pre-treated with the urea or other discoloration-inhibitors before blending with wool fibers or filaments in a spinning operation or with wool yarns in a weaving, knitting, or other fabric-making operation respectively. The nylon-wool-fabric may then be dyed with a wide variety of acid dyes which dye the wool to a deep shade without dyeing the nylon or with only a slight dyeing of the nylon.

In the following examples, which are illustrative of the invention, the parts and percentages are by weight unless otherwise stated.

*Example 1*

(a) A scoured nylon taffeta in dry condition is padded through a 30% solution of urea in water at room temperature. It is then air-dried and cured at 300° F. for 10 minutes. Then the fabric is thoroughly rinsed in water to remove unreacted urea, and air-dried. On subsequently heating the fabric for five hours at 300° F. only slight discoloration occurred. A control nylon taffeta treated identically but omitting urea from the solution in the pad exhibited noticeably more discoloration.

(b) The procedure of part (a) is repeated except the concentration of the urea is changed from 30% to 20%, 40%, and 50% in several successive runs. Similar results are obtained.

(c) The procedure of part (a) is repeated except that the concentration of urea is 20% and the curing of the treated fabric is effected by heating to 325° F. for about five minutes.

*Example 2*

(a) A scoured nylon taffeta in dry condition is padded through a 30% solution of urea in water. It is air-dried and cured at 300° F. for 10 minutes. Then the fabric is thoroughly rinsed in water to remove unreacted urea, and air-dried.

(b) A reaction vessel is charged with 96 parts of methanol, 18 parts of an aqueous 36.3% formaldehyde solution, and 78.5 parts of 91% paraformaldehyde flake. The mixture is adjusted to a pH of 8.5 with 10% sodium hydroxide solution and gently heated at reflux until it becomes clear. Urea is added in an amount of 60 parts, the pH of the mixture is readjusted, and the mixture is then heated at 70° to 75° C. for 20 minutes. The mixture is treated with a solution of phosphoric acid in methanol to a pH of about 3.5 and heated under reflux for 15 minutes. The mixture is cooled to 55° C. Alkali solution is added to bring the pH to 7.2 and the mixture heated under reduced pressure to remove the bulk of volatile materials. The product is a clear, practically colorless syrup having a viscosity of G on the Gardner-Holdt scale. It has a specific gravity of 1.22 and is miscible with water in all proportions.

(c) Eight parts by weight of the heat-convertible syrup obtained in the preceding paragraph is introduced into 91.5 parts by weight of water and then 0.5% of ammonium chloride is added. The nylon taffeta pre-treated with urea as above is padded through the resulting solution of the methylated methylol urea, air-dried and then cured at 300° F. for 10 minutes. Less discoloration of the fabric is observed than that of a control fabric treated by part (c) without the pre-treatment in part (a) hereof. When the curing of the urea-pre-treated fabric and the control was extended to a period of one hour, the urea-treated fabric showed only slightly more discoloration whereas the control fabric was markedly further discolored.

*Example 3*

A nylon taffeta is treated with urea by the procedure of Example 2(a).

Then a solution containing 16 parts of a heat-convertible methylated methylol melamine condensate and 0.5 part of ammonium chloride in water was applied to the treated nylon in a textile pad. The fabric was then air-dried and cured at 300° F. for ten minutes. The reduced discoloration obtained was similar to that obtained in Example 2(c) with the 10-minute curing period. When curing was extended to one hour, the control fabric was even more discolored than the control in Example 2(c) when cured one hour whereas the urea-pre-treated fabric was comparable to the urea-pre-treated fabric of Example 2(c) cured one hour.

*Example 4*

A nylon taffeta is treated with urea by the procedure of Example 2(a).

Then a solution containing 16 parts of a heat-convertible methylol diethylene glycol dicarbamate condensate and 0.5 part of ammonium chloride in water was applied to the treated nylon in a textile pad. The fabric was then air-dried and cured at 300° F. for ten minutes. The reduced discoloration obtained was similar to that obtained in Example 2(c) with the 10-minute curing period. When curing was extended to one hour, the control fabric was even more discolored than the control in Example 2(c) when cured one hour whereas the urea-pre-treated fabric was comparable to the urea-pre-treated fabric of Example 2(c) cured one hour.

*Example 5*

A scoured nylon taffeta in dry condition is padded through a 30% dispersion of biuret in dimethylformamide at room temperature. It is then air-dried and cured at 300° F. for 10 minutes. Then the fabric is thoroughly rinsed in water to remove unreacted biuret, and air-dried. On subsequently heating the fabric for five hours at 300° F. only slight discoloration occurred. A control nylon taffeta treated identically but omitting biuret from the dispersion in the pad exhibited noticeably more discoloration.

*Example 6*

A scoured nylon taffeta in dry condition is padded through a 30% dispersion of dicyandiamide in dimethylformamide at room temperature. It is then air-dried and cured at 300° F. for 10 minutes. Then the fabric is thoroughly rinsed in water to remove unreacted dicyandiamide, and air-dried. On subsequently heating the fabric for five hours at 300° F. only slight discoloration occurred. A control nylon taffeta treated identically but omitting dicyandiamide from the dispersion in the pad exhibited noticeably more discoloration.

Example 7

A scoured nylon taffeta in dry condition is padded through a 30% solution of ammonium cyanate in water at room temperature. It is then air-dried and cured at 300° F. for 10 minutes. Then the fabric is thoroughly rinsed in water to remove unreacted ammonium cyanate, and air-dried. On subsequently heating the fabric for five hours at 300° F. only slight discoloration occurred. A control nylon taffeta treated identically but omitting ammonium cyanate from the solution in the pad exhibited noticeably more discoloration.

It is to be understood that changes and variations may be made without departing from the spirit and scope of the invention as defined in the appended claims.

I claim:

1. A process for treating a textile material of a water-insoluble long-chain synthetic polymeric amide having recurring carbonamide groups as an integral part of the main polymer chain to reduce discoloration thereof on ageing and heating comprising impregnating said polyamide with an aqueous solution containing 5% to 50% by weight of a solute consisting exclusively of at least one compound selected from the group consisting of urea, biuret, dicyandiamide, and ammonium cyanate, drying the impregnated textile to leave thereon a deposit of at least about 5%, based on the weight of said polyamide, of said solute, and then heating said polyamide carrying said deposit at a temperature between 240° F. and about 450° F. for a period of time between about two seconds and four hours, the time and temperature being generally inversely related.

2. A process for treating a textile material of a water-insoluble long-chain synthetic polymeric amide having recurring carbonamide groups as an integral part of the main polymer chain to reduce discoloration thereof on ageing and heating comprising impregnating said polyamide with an aqueous solution containing 5% to 50% by weight of a solute consisting exclusively of urea, drying the impregnated textile to leave thereon a deposit of at least about 5%, based on the weight of said polyamide, of said solute, and then heating said polyamide carrying said deposit, at a temperature between 240° F. and about 450° F. for a period of time between about two seconds and four hours, the time and temperature being generally inversely related.

3. A process for treating a textile material of a water-insoluble long-chain synthetic polymeric amide having recurring carbonamide groups as an integral part of the main polymer chain to reduce discoloration thereof on ageing and heating comprising impregnating said polyamide with an aqueous solution containing 5% to 50% by weight of a solute consisting exclusively of dicyandiamide, drying the impregnated textile to leave thereon a deposit of at least about 5%, based on the weight of said polyamide, of said solute, and then heating the polyamide carrying said deposit, at a temperature between 240° F. and about 450° F. for a period of time between about two seconds and four hours, the time and temperature being generally inversely related.

4. A process for treating a textile material of a water-insoluble long-chain synthetic polymeric amide having recurring carbonamide groups as an integral part of the main polymer chain to reduce discoloration thereof on ageing and heating comprising impregnating said polyamide with an aqueous solution containing 5% to 50% by weight of a solute consisting exclusively of biuret, drying the impregnated textile to leave thereon a deposit of at least about 5%, based on the weight of said polyamide, of said solute, and then heating said polyamide carrying said deposit, at a temperature between 240° F. and about 450° F. for a period of time between about two seconds and four hours, the time and temperature being generally inversely related.

5. A process for treating a textile material of a water-insoluble long-chain synthetic polymeric amide having recurring carbonamide groups as an integral part of the main polymer chain to reduce discoloration thereof on ageing and heating comprising impregnating said polyamide with an aqueous solution containing 5% to 50% by weight of a solute consisting exclusively of ammonium cyanate, drying the impregnated textile to leave thereon a deposit of at least about 5%, based on the weight of said polyamide, of said solute, and then heating said polyamide carrying said deposit, at a temperature between 240° F. and about 450° F. for a period of time between about two seconds and four hours, the time and temperature being generally inversely related.

6. A process for treating a textile material of a water-insoluble long-chain synthetic polymeric amide having recurring carbonamide groups as an integral part of the main polymer chain to reduce discoloration thereof on ageing and heating comprising impregnating said polyamide with an aqueous solution containing 5% to 50% by weight of a solute consisting exclusively of at least one compound selected from the group consisting of urea, biuret, dicyandiamide, and ammonium cyanate, drying the impregnated textile to leave thereon a deposit of at least about 5%, based on the weight of said polyamide, of said solute, and then heating said polyamide carrying said deposit at a temperature between 240° F. and about 450° F. for a period of time between about two seconds and four hours, the time and temperature being generally inversely related, and subsequently applying to the textile material a heat-convertible resin-forming aminoplast condensate selected from the group consisting of urea-formaldehyde condensates having a formaldehyde to urea molar ratio of at least 2:1, melamine-formaldehyde condensates, and thiourea-formaldehyde condensates, as well as the alkylation products obtained from said condensates obtained from alcohols having from 1 to 4 carbon atoms, and baking the textile carrying such condensate at a temperature of 240° F. to 450° F. to cure the condensate.

7. As a new article of manufacture, a stiffened textile material of a water-insoluble polyamide condensation product obtained by the process of claim 1.

8. An article as defined in claim 7 in which the textile is reacted with urea.

9. An article as defined in claim 7 in which the textile is reacted with biuret.

10. An article as defined in claim 7 in which the textile is reacted with dicyandiamide.

11. An article as defined in claim 7 in which the textile is reacted with urea and the aminoplast is a urea-formaldehyde condensate.

12. An article as defined in claim 7 in which the textile is reacted with urea and the aminoplast is a melamine-formaldehyde condensate.

13. An article as defined in claim 7 in which the textile is reacted with biuret and the resin-forming condensate is a urea-formaldehyde condensate.

14. An article as defined in claim 7 in which the textile is reacted with biuret and the resin-forming condensate is a melamine-formaldehyde condensate.

15. An article as defined in claim 7 in which the textile is reacted with dicyandiamide and the resin-forming condensate is a condensate of urea and formaldehyde.

References Cited in the file of this patent

UNITED STATES PATENTS

| 2,458,397 | MacGregor | Jan. 4, 1949 |
| 2,577,957 | Farnworth | Dec. 11, 1951 |

FOREIGN PATENTS

| 547,844 | Great Britain | Sept. 14, 1942 |